(12) United States Patent
Poder

(10) Patent No.: US 7,316,425 B2
(45) Date of Patent: Jan. 8, 2008

(54) QUICK CONNECTOR

(75) Inventor: Philippe Poder, Guichen (FR)

(73) Assignee: Legris SA, Rennes (FR)

( * ) Notice: Subject to any disclaimer, the term of this patent is extended or adjusted under 35 U.S.C. 154(b) by 34 days.

(21) Appl. No.: 10/482,309

(22) PCT Filed: Jun. 28, 2002

(86) PCT No.: PCT/FR02/02247

§ 371 (c)(1),
(2), (4) Date: Dec. 30, 2003

(87) PCT Pub. No.: WO03/008852

PCT Pub. Date: Jan. 30, 2003

(65) Prior Publication Data

US 2004/0189001 A1     Sep. 30, 2004

(30) Foreign Application Priority Data

Jul. 12, 2001   (FR) ................... 01 09275

(51) Int. Cl.
*F16L 35/00* (2006.01)

(52) U.S. Cl. ................. 285/93; 285/305; 285/319

(58) Field of Classification Search ............ 285/3, 285/93, 305, 319, 81, 4
See application file for complete search history.

(56) References Cited

U.S. PATENT DOCUMENTS 5,695,223 A * 12/1997 Boticki ............... 285/23
5,863,077 A * 1/1999 Szabo et al. .......... 285/3
6,139,214 A * 10/2000 Zirps et al. ......... 403/325
6,145,886 A   11/2000 Ohta et al.
6,206,435 B1 * 3/2001 Le Clinche .......... 285/305

FOREIGN PATENT DOCUMENTS

| EP | 0 505 930 | 9/1992 |
| EP | 0 846 907 | 6/1998 |
| EP | 0 992 729 | 4/2000 |
| FR | 2 705 431 | 11/1994 |

* cited by examiner

*Primary Examiner*—Aaron Dunwoody
(74) *Attorney, Agent, or Firm*—Young & Thompson

(57) ABSTRACT

A quick connector includes a female portion with a staggered bore whereof one cross-section with large diameter can receive an outer flange of a male portion of the connector beyond a lock, the lock including a ring having an orifice for allowing through the flange and mounted in a housing provided in the female portion at the cross-section with large diameter of its bore to slide radially in the housing between a first inactive locking position wherein the passage orifice of the ring is eccentric relative to the axis of the bore and a second retracted position wherein the passage orifice is substantially coaxial with the bore. The lock further including a locking indicator mounted radially sliding in the ring between a first indicating position wherein the locking indicator does not obstruct the passage orifice and a second indicating position wherein the locking indicator obstructs the passage orifice.

10 Claims, 2 Drawing Sheets

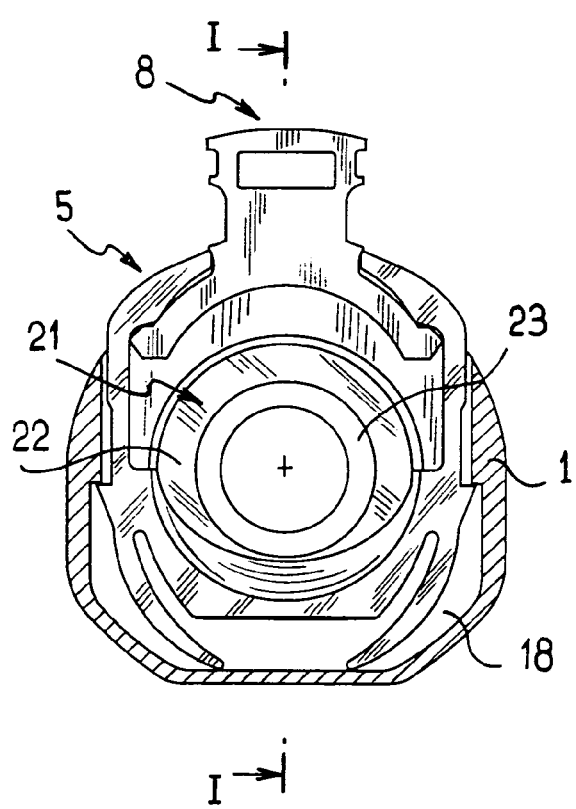
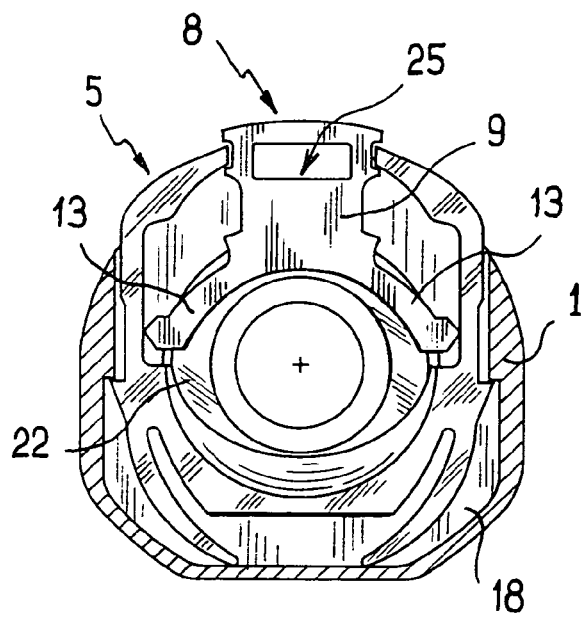
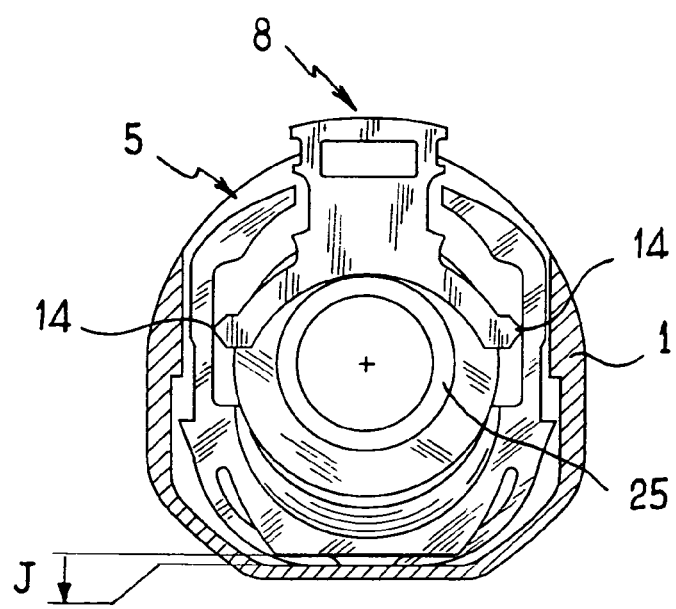

QUICK CONNECTOR

CROSS REFERENCE TO RELATED APPLICATIONS

This is the 35 USC 371 National Stage of International Application PCT/FR02/02247 filed on 28 Jun. 2002, which designated the United States of America.

FIELD OF THE INVENTION

The present invention relates to a quick connector comprising a male part and a female part which are coupled together merely by inserting one in the other.

BACKGROUND OF THE INVENTION

In circuits that convey fluids under pressure and that make use of quick connectors, it is desirable, and often required, to make use of means that lock a connection in positive manner. A badly-made connection is firstly a source of leakage, and secondly runs the risk of decoupling, where the least severe consequence is a breakdown of the machine including said pressurized fluid circuits, and if the machine is a motor vehicle, a more severe consequence could be to lead to an accident (no pressure in the hydraulic brake circuit, fuel leaking into the engine compartment possibly leading to a fire, . . . ).

Numerous devices exist for locking the male element in the female element of a quick connector. Substantially all of them operate on the same principle and implement identical general means consisting in a keying member which is interposed between a radial surface of the endpiece (a groove or a collar) and a radial surface of the female element (likewise a groove or a collar). The keying member may be inserted manually or it may be held in its locking position by a resilient return member, the keying member being suitable, while the endpiece is being inserted, for being put into a retracted position against the force of the return member (either by being displaced or by being deformed).

In a particularly simple embodiment of such a device as described in document FR 2 705 430, the latch is constituted by a ring mounted to slide radially in a housing formed in the female part of the connector between a rest and locking first position in which it is off-center relative to the axis of the bore of the female part, and a retracted second position in which it lies substantially on the axis of said bore.

A resilient member constituted by two tongues made integrally with the ring is interposed between the ring and the female part, and urges the ring towards its first position after the collar has passed through.

It is found that that mode of locking does not provide sufficient guarantee that the male part has been properly engaged in the female part. The male part can be engaged sufficiently for the collar to force the ring to move against the return tongues, but not far enough for the collar to clear the ring, thereby preventing the ring from taking up its locking position behind the collar under drive from the elastic tongues. This situation is not blatantly visible to the operator, who might believe that the connection has been made properly.

Documents EP 0 505 930, EP 0 846 907, FR 2 705 432, and U.S. Pat. No. 6,145,886 disclose connectors fitted with locking indicators that indicate that the connector has been locked properly, the locking indicator being disposed downstream from the locking member so as to be driven by the collar after it has gone past the locking member. In the connectors illustrated in those documents, the female part has special openings to enable co-operation between the locking indicator and the collar of the male part while it is being inserted, thereby weakening the female part and making it more complicated to manufacture.

In document EP 0 992 729, the locking indicator is likewise disposed in an axially off-center position relative to the locking member, but upstream from the locking member at the end of the female part. The locking indicator is driven not by the collar of the male part, but by an accessory entrained by the male part on being inserted in the female part, thereby making that type of connector more complex.

OBJECTS AND SUMMARY OF THE INVENTION

The invention seeks to remedy those drawbacks, and more precisely it provides a quick connector comprising a female part with a stepped bore having a larger-diameter section suitable for receiving an external collar of a male part of the connector beyond a latch, the latch being constituted by a ring having a through orifice for passing the collar and of a diameter close to that of the collar, the ring being mounted in a housing formed in the female part at the larger-diameter section of its bore to slide radially in the housing between a rest and locking first position in which the orifice of the ring is off-center relative to the axis of the bore, and a retracted, second position in which the through orifice is substantially coaxial with the bore. According to the invention, the latch includes a locking indicator mounted to slide radially in the ring.

Thus, the locking indicator of the invention is included without any need to provide special openings in the female portion of the connector, and without any additional parts or accessories. The connector is thus unchanged overall, with only the ring being modified to receive the locking indicator.

In an embodiment, the locking indicator is movable in the ring between a first reference position in which the locking indicator does not obstruct the through orifice in the ring, and a second reference position in which the locking indicator obstructs said through orifice.

In order to verify the connection between the male part and the female part has been made correctly, the operator in charge of making the connection is required to drive in the locking indicator of the invention after the male part has been inserted in the female part.

If it is possible to move the locking indicator into the second reference position, then it obstructs the through orifice in the ring for passing the collar. This thus constitutes a sure sign that the collar is no longer in the orifice, since otherwise the presence of the collar would have prevented the locking indicator from moving.

In contrast, if it is not possible to move the locking indicator into the second position, then the male part has not been engaged far enough into the female part to ensure that the collar has gone past the ring.

The locking indicator thus acts as an indicator of good connection between the male part and the female part, thus serving to guarantee that the connection is of good quality.

In a preferred embodiment, the locking indicator and the ring include means for preventing them from moving relative to each other when the locking indicator is in one or the other of the reference positions.

On passing through the orifice in the ring, the collar pushes away the locking indicator until it no longer obstructs the through orifice. The locking indicator is then in the first reference position, and it is prevented from moving relative to the ring by the means provided for that purpose. When the collar has gone past the ring, the ring moves into its rest position, and the locking indicator remains held in its first reference position, until the operator drives it manually towards the second reference position where it is again prevented from moving relative to the ring.

These means for preventing it from moving serve to guarantee that the locking indicator is stationary relative to the ring and cannot move between the two reference positions unless deliberately driven by the operator.

Preferably, and prior to making a first connection, the locking indicator and the ring are secured to each other by means of a temporary connection in an intermediate position between the first and second reference positions, the intermediate position being selected in such a manner that the locking indicator obstructs the through orifice in the ring.

Thus, before any connection, the locking indicator is held in an intermediate position which can be recognized visually and/or tested by attempting to move the locking indicator slightly, thereby enabling the operator to know immediately whether the female part has already been used or not. Furthermore, the ring and the locking indicator can thus be manufactured as a single part, thereby simplifying manufacture and assembly of the connector.

By way of example, the temporary connection is constituted by ligaments joining the ring to the locking indicator together, the ligaments being broken on first connection when the collar passes between the ring and the locking indicator.

According to a characteristic of the invention, the intermediate position is such that the distance between the locking indicator and the endpiece of the male part is less than a displacement stroke of the ring in the housing.

Thus, when the male part is engaged in the female part without the collar going past the through orifice, the effect of the operator pressing on the locking indicator will be to press the ring against the flexible tongues. The locking indicator will then come into abutment against the endpiece of the male part prior to the ring coming into abutment against the bottom of the housing. The temporary connection between the ring and the locking indicator will not be broken and when the operator ceases to press on the locking indicator, it will move back up together with the ring. The operator thus has visual proof that the connection has not been made properly.

According to an aspect of the invention, the locking indicator includes a drive portion projecting outside the female part when the locking indicator is in the first position, and substantially retracted into the female part when the locking indicator is in the second position.

The drive portion has an opening for receiving a driving tool, the opening being accessible when the locking indicator is in the second reference position.

When the drive portion is pushed into the female part, it is no longer possible to take hold of it with the fingers in order to drive the locking member. To be able to drive the locking member, it is necessary to insert a tool in the opening through a rear setback formed in the female part and giving a tool access to the opening.

The locking indicator also has flanges extending the drive portion towards the inside of the ring housing, the flanges in part facing the end walls of the housing, at least when the locking indicator is in the second reference position.

BRIEF DESCRIPTION OF THE DRAWINGS

The invention will be better understood in the light of the following description of an embodiment of the invention with reference to the accompanying figures, in which:

FIG. 4 is a view analogous to FIG. 2 at the end of insertion of the male part into the female part, the ring being in the rest position while the locking indicator is in the first reference position;

FIG. 5 is a view analogous to FIG. 2, after the locking indicator has been moved into the second reference position, the ring being in the rest position; and FIG. 6 is a view analogous to FIG. 2, showing a situation in which only the endpiece of the male part has been engaged.

DETAILED DESCRIPTION OF THE INVENTION

For reasons of clarity, the male part, the ring, and the locking indicator are not shown in section in FIGS. 2 to 6.

Figure 1:
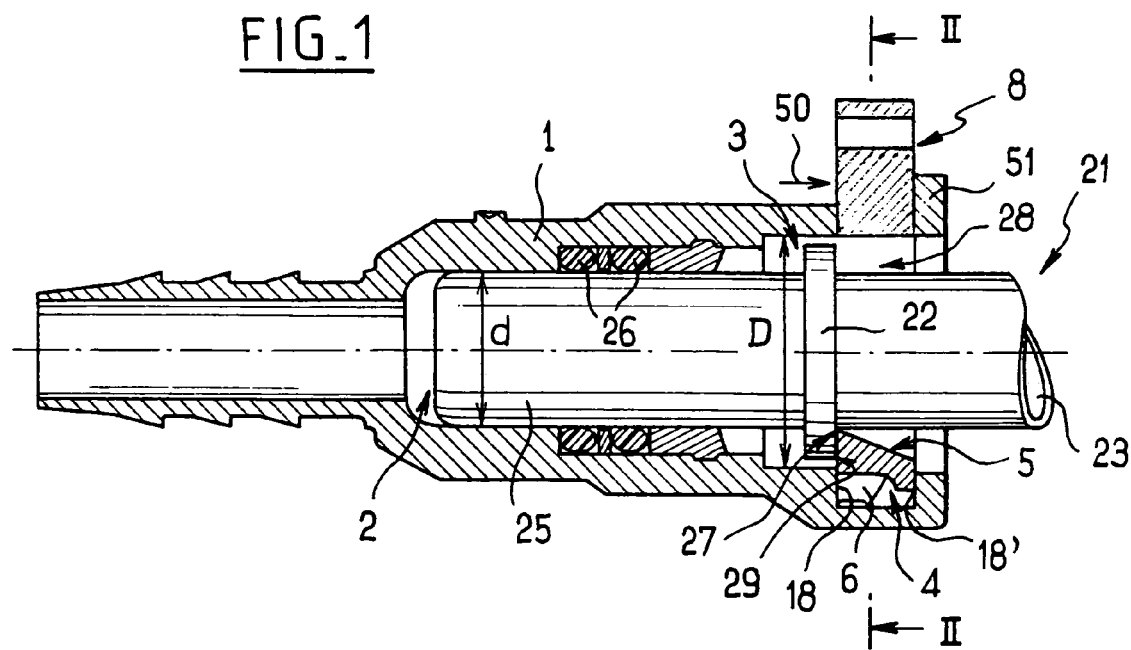
FIG. 1 is a longitudinal section view on line I-I of FIG. 3 showing a quick connector of the invention, the male part being inserted in the female part, the ring being in the rest position while the locking indicator is in the first reference position.

With reference to FIG. 1, a connector of the invention comprises a female part 1 extending along a longitudinal axis and subdivided into a plurality of sections. A first section 2 of diameter d serves to receive the cylindrical endpiece 25 of a male part 21. O-rings 26 are disposed in the female part 1 so as to bear against the endpiece 25 of the male part 21 in order to seal the connection. A second section 3 of larger diameter D is provided to receive an external collar 22 on the male part 21. The section 3 is provided with a housing 4 defined by two plane end walls 18, 18' extending perpendicular to the axis of the female part 1 and providing a passage for radial sliding of a ring 5 in the housing 4. According to the invention, the housing 4 also receives a locking indicator 8 described in greater detail below.

Figure 2:
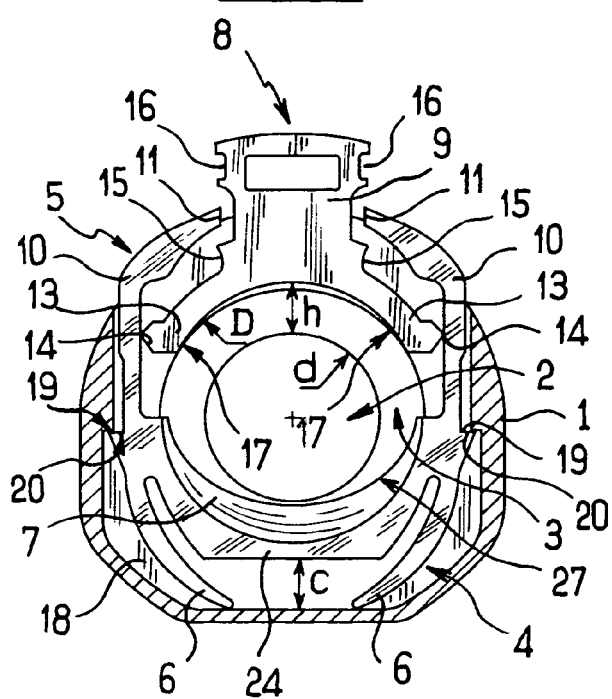
FIG. 2 is a section view of the quick connector on line II-II of FIG. 1 passing through the housing for the ring and the locking indicator, the male part being removed, the ring being in the rest position while the locking indicator is in an intermediate position between the first and second reference positions.

As can be seen more clearly in FIG. 2, the ring 5 comprises in conventional manner resilient tongues 6 bearing against the bottom of the housing 4 and exerting a return force towards the rest position of the ring 5 as defined by steps 19 in the housing 4 co-operating with steps 20 on the ring 5.

The ring 5 also has a conical surface 7 extending in a cone to a circular edge 27 of diameter slightly greater than the diameter D of the larger section 3. The edge 27 defines a portion of a circular through orifice 28 allowing the collar 22 to pass through the ring 5.

The through orifice 28 is represented herein solely by the edge 27, but it must be understood as being a virtual orifice passing through the ring along an axis parallel to the axis of female part 1, bearing against the edge 27, and being cylindrical in shape with a diameter slightly greater than the diameter of the collar 22.

In the position shown in FIG. 2, the through orifice 28 is offset relative to the axis of the female part 1. The conical surface 7 allows the end 25 of the male part to pass freely into the section 2, but constitutes an obstacle against insertion of the collar into the section 3 downstream from the ring 5.

According to the invention, the female part 1 is fitted with a locking indicator 8. The locking indicator 8 comprises a drive portion 9 projecting from the ring 5. For this purpose, the ring 5 is open and presents two branches 10 whose ends 11 face the sides of the drive portion 9.

Two flanges 13 extend from the drive portion 9 having their ends connected to the ring 2 via breakable ligaments 14. Each flange 13 possesses a bearing portion 17 facing towards the inside of the housing 4, so that the bearing portion 17 is substantially tangential to a virtual cylinder of diameter D extending along the axis of the female part and extending the larger section 3.

The ring 5 and the locking indicator 8 are advantageously manufactured together, e.g. by injection molding a plastics material, thus facilitating manufacture and installation in the housing 4.

Once the ligaments 14 are broken, the locking indicator 8 can be moved radially between a stable first reference position in which the ends 11 of the branches 10 of the ring 5 snap into lateral recesses 15 at the base of the drive portion 9, and a stable second reference position in which the ends 11 snap into lateral recesses 16 at the top of the drive portion 9.

So long as the ligaments 14 have not been broken, the locking indicator 8 is in an intermediate position between the two reference positions, the intermediate position being selected in such a manner that the locking indicator 8 obstructs the through orifice 28. In FIG. 2, it can be seen that the locking indicator 8 projects from the female part 1, the drive portion 9 being halfway into the female part 1, thus informing an operator immediately that the locking indicator 8 is in the intermediate position.

Figure 3:
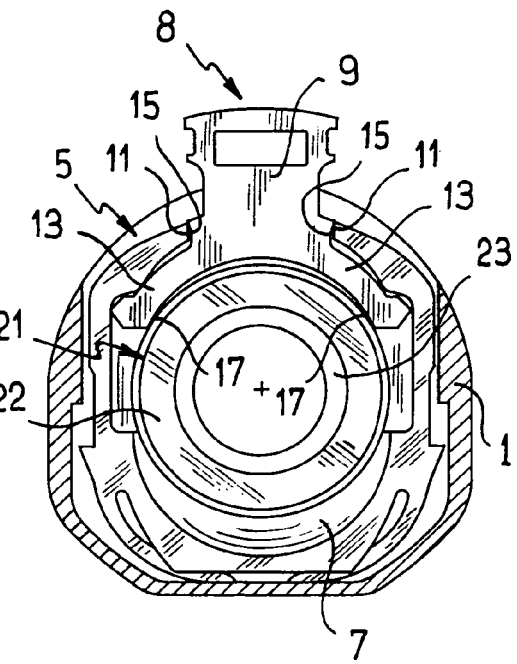
FIG. 3 is a view analogous to FIG. 2 during insertion of the male part into the female part, the ring being in the retraced position while the locking indicator is in the first reference position.

In FIG. 3, the male part 21 represented by the collar 22 and the tubular portion 23 is shown while it is being inserted. The cylindrical end 25 (not shown in this figure) of the male part 21 has been slid between the ring and the locking indicator so as to be inserted into the section 2 of the female part, and it has been possible to slide the collar 22 under the bearing portions 17 of the flanges 13 of the locking indicator 8, but it has come into abutment against the conical surface 7 of the ring 5.

By forcing the male part 21 into the female part 1, the ligaments 14 holding the locking indicator 8 to the ring 5 give way, thereby separating the ring 5 from the locking indicator 8. The ring 5 is then free to move radially under thrust from the collar 22 against the ramp-forming conical surface 7 and against the return force exerted by the flexible tongues 6, until the bearing portions 17 of the locking indicator 8 come to bear against the periphery of the collar 22. The ring 5 moves until the edge 27 of the conical surface 7 passes under the collar 22, which is the position shown in FIG. 3. In this position, the through orifice 28 is centered on the axis of the female part 1, and the locking indicator 8 is held by the periphery of the collar 22 so that it does not obstruct the through orifice 28. The collar 22 can then pass between the ring 5 and the locking indicator 8.

It should be observed that in this position the ends 11 of the branches 11 of the ring 5 have snapped into the lateral recesses 15 of the locking indicator, such that the locking indicator is in the first reference position.

In order to facilitate passage of the collar between the ring 5 and the locking indicator 8, it is possible to provide cam surfaces on the flanges of the locking indicator at the bearing portions 17.

In FIG. 6, there can be seen a situation in which the male part, represented by the endpiece 25, has been engaged partway into the female part, but without the collar 22 reaching the ring 5.

If the operator presses on the drive portion 9 of the locking indicator 8, the ring/indicator assembly is pushed against the flexible tongues 6 and it can be seen in the situation as illustrated in this figure that the locking indicator comes into abutment against the endpiece 25, while the ring 5 is not in abutment against the bottom of the housing 4, as represented in the figure by clearance J between the ring 5 and the bottom of the housing 4. It is therefore not possible for the ligaments 14 to be broken, and when the operator ceases to apply thrust, the locking indicator 8 rises together with the ring 5 in order to return to its initial position, i.e. the intermediate position.

To ensure that there is clearance J between the ring 5 and the bottom of the housing 4, it is necessary, as shown in FIG. 2, for the distance h between the locking indicator 8 and the endpiece 25 to be less than the stroke c in the housing 4.

The operator can thus see that the connection has not been made.

In FIG. 4, the collar 22 has gone past the ring 5 and the ring has returned to its initial position under the return force exerted by the flexible tongues 6. The through orifice 28 is again off-center, the locking indicator 8 then being in the first reference position, with the drive portion 9 clearly projecting from the female part 1.

In this position, the branches 10 of the ring are facing the plane end walls 18 and 18' of the housing 4, while the ring 5 possesses a wall portion 29 facing the collar 22. The ring 5 forms a latch interconnecting the male part and the female part and opposing withdrawal of the male part. In order to reinforce such opposition, the ring 5 is fitted with a bib 24 which, when the ring 5 is in the rest position, extends so as to face the plane end wall 18' of the housing 4 (not visible in FIG. 4).

In order to confirm the connection, the operator presses on the drive portion 9 of the locking indicator 8 so as to bring it into the position shown in FIG. 5, which is the second reference position, and in which the ends 11 of the branches 10 of the ring 5 are snapped in the side recesses 16 of the locking indicator 8.

If this operation is possible, that is because the collar 22 has indeed been engaged in the female part beyond the ring 5, so the ring has been able to return to its initial, rest position.

Otherwise, the collar 22 constitutes an obstacle for the bearing portions 7 on the flanges 13 of the locking indicator 8, so the indicator cannot be pushed in, and a fortiori it cannot be placed in the second reference position. The operator immediately detects that the connection has been badly made.

Should it happen that the collar 22 goes past the ring 5 but without the ring returning to its initial position, for example because of the presence of an obstacle or because one of the flexible tongues 6 breaking, then the operator can see prior to applying any drive that the locking indicator 8 has remained in a position close to the intermediate position instead of being moved towards the first reference position. If the operator were not to see this, and were to attempt to push the locking indicator 8 towards the second reference position, it would not be possible to snap the indicator into that position. The operator is thus likewise made aware that the connection is bad.

In the second reference position, the locking indicator 8 hardly projects at all from the female part 1, unlike the three situations described with reference to FIGS. 2 to 4. It is thus possible at a glance on observing the position of the locking indicator to verify whether a connection has been made properly and confirmed by the operator.

The locking indicator thus acts as a visual indicator of proper connection.

The lateral recesses 15 and 16 and the ends 11 of the branches 10 of the ring 5 are arranged in such a manner that the force needed to separate the locking indicator 8 from the first reference position and the force needed to engage the locking indicator 8 in the second reference position are less than the force needed to bend the flexible tongues 6 of the ring 5.

In addition, moving the locking indicator 8 into the second reference position serves to reinforce the resistance to withdrawal of the male part from the female part. As can be seen in FIG. 5, the major fractions of the flanges 13 and of the base of the drive portion 9 of the locking indicator 8 are facing the collar 22 and thus project into the through orifice 28 of the ring, while the ends of the flanges 13 and the top of the drive portion 9 of the locking indicator 8 are facing the end walls 18, 18' of the housing 4. The locking indicator thus constitutes an obstacle against withdrawal of the male part 21 from the female part 1.

The locking indicator 8 thus also acts as a latch, adding its effect to that of the ring 5 so as to increase the force required to tear the male part out from the female part.

In order to disconnect the male part from the female part, it is necessary to replace the locking indicator in the first reference position. Since the drive portion 9 is pushed into the housing 4, it is not possible to move the locking indicator 8 by hand. It is necessary to insert the end of a tool into a slot 25 formed in the end of the drive portion 9 of the locking indicator 8 and to pull the locking indicator 8 back into the first reference position. It is therefore not possible to replace the locking indicator 8 unintentionally in the first reference position after it has been placed in the second reference position.

It should be observed that the slot 25 is accessible only from behind the ring 5, as represented in FIG. 1 by arrow 50. When the locking indicator 8 is in the second reference indicator, the slot 25 is level with the arrow 50 and access thereto from the other side is prevented by the presence of an extension 51 on the female part that serves to increase the area against which the locking indicator 8 bears against the female part 1.

Thereafter, it is necessary to press against the branches 10 of the ring 5 in order to retract the ring to a position similar to that shown in FIG. 2. The collar 22 can then pass between the ring 5 and the locking indicator 8.

The invention is not limited to the particular embodiment described above, but on the contrary extends to cover any variant which comes within the ambit of the invention as defined by the claims.

In particular, although it is stated that the locking indicator and the ring are made together, the invention also applies to a locking indicator that is independent from the ring. Under such circumstances, the locking indicator can likewise be held in the intermediate position by snap-fastening means, or by a small spot of adhesive on the ends of the branches of the locking indicator. The intermediate position could equally well not exist, with the locking indicator being initially placed in the first reference position on assembly, or prior to inserting the male part.

Although it is stated that the locking indicator is snap-fastened to the ring in the first and second reference positions, the invention applies more generally to a locking indicator and a ring having mutual locking means. For example, it is possible to envisage a mere braking effect in the first reference position since the indicator is not destined to remain therein for a long time, while positive locking could be provided for the second reference position, e.g. by interposing a keying member such as a pin, or the like.

What is claimed is:

1. A quick connector comprising:
   a latch,
   a female part (1) with a stepped bore having a first section (2) suitable for sealingly receiving an endpiece (25) of a male part (21), and
   a second section (3) of larger diameter suitable for receiving an external collar (22) of the male part (21) beyond the latch,
   the latch being constituted by a ring (5) having a through orifice (28) for passing the collar (22) and of diameter close to the diameter of the collar (22),
   the ring (5) being mounted in a housing (4) formed in the female part (1) in the larger-diameter section (3) of its bore to slide radially in the housing (4), in a direction perpendicular to the axis of the bore, between a rest and locking first position in which the through orifice (28) in the ring (5) is off-center from an axis of the bore, and a retracted, second position, in which the through orifice (28) is substantially coaxial with the bore,
   wherein the latch includes a locking indicator (8) mounted to slide radially in the ring (5) and relative thereto, in a direction perpendicular to the axis of the bore, and being movable under voluntary operation between a first reference position within the ring indicating that the collar (22) has gone past the ring (5), and a second reference position within the ring indicating that the male part (21) has been locked properly, the ring and the locking indicator further comprising mutual locking means (11, 15, 16) for selectively securing the locking indicator (8) to the ring (5) in each of the reference positions so that the locking indicator (8) and the ring (5) are prevented from moving relative to each other when the locking indicator is in one of the reference positions.

2. A quick connector according to claim 1, wherein, in the first reference position, the locking indicator (8) does not obstruct the through orifice (28) of the ring (5), and in the second reference position, the locking indicator (8) obstructs said through orifice (28) so as to form an obstacle to the collar (22) passing therethrough, thereby contributing to locking of the male part into the female part.

3. A quick connector according to claim 1, wherein, prior to making a first connection, the locking indicator (8) and the ring (5) are secured to each other by means of a temporary connection in an intermediate position between the first and second reference positions, the intermediate position being selected in such a manner that the locking indicator (8) obstructs the through orifice in the ring (5).

4. A quick connector according to claim 3, wherein the temporary connection is constituted by ligaments (14) joining the ring (5) to the locking indicator (8), the ligaments (14) being broken on first connection when the collar (22) passes between the ring (5) and the locking indicator (8).

5. A quick connector according to claim 3, wherein, when the locking indicator (8) is held to the ring (5) in the intermediate position, the distance (h) between the locking indicator and the endpiece (25) of the male part (21) is less than a displacement stroke (c) of the ring (5) in the housing (4).

6. A quick connector according to claim 1, wherein the locking indicator (8) includes a drive portion (9) projecting outside the ring (5) when the locking indicator (8) is in the first position, and substantially retracted into the female part (1) when the locking indicator (8) is in the second position.

7. A connector according to claim 6, wherein the drive portion has an opening (25) for receiving a driving tool, the opening (25) being accessible when the locking indicator (8) is in the second reference position.

8. A quick connector according to claim 1, wherein the locking indicator includes flanges (13) extending from the drive portion (9) towards the inside of the housing (4) for the ring, the flanges facing in part end walls (18, 18') of the housing (4), at least when the locking indicator (8) is in the second reference position.

9. A quick connector according to claim 1, wherein the mutual locking means comprises:
branches (10) having ends (11) that extend from the ring (5);
first recesses (15) on the locking indicator (8) in which the ends of the branches snap when the locking indicator is brought to the first reference position;
second recesses (16) on the locking indicator (8) in which the ends of the branches snap when the locking indicator is in the second reference position,
wherein snapping of the ends in the first or second recesses causes the locking indicator and the ring to be mutually locked.

10. A quick connector, comprising:
a male part (21) having an endpiece (25) and an external collar (22);
a latch;
a female part (1) with a stepped bore having a first section (2) to sealingly receive the endpiece (25), and a second section (3) of larger diameter to receive the external collar (22) of the male part (21) beyond the latch,
the latch constituted by a ring (5) having a through orifice (28) for passing the collar (22);
a housing (4), within the larger-diameter second section (3) of the female part (1), mounting the ring (5);
the ring (5) being mounted in the housing (4) to slide radially in the housing (4), in a direction perpendicular to an axis of the bore, between
i) a rest and locking first position in which the through orifice (28) in the ring (5) is off-center from the axis of the bore, and
ii) a retracted, second position, in which the through orifice (28) is substantially coaxial with the bore;
a locking indicator (8) included in the latch and mounted to slide radially in the ring (5), in a direction perpendicular to the axis of the bore, and being movable relative to the ring, under manual operation, between i) a first reference position indicating that the collar (22) has gone past the ring (5), and ii) a second reference position indicating that the male part (21) has been locked properly,
the ring and the locking indicator having mutual locking means (11,15,16) for securing the locking indicator to the ring when the locking indicator is in one of the reference positions so that the locking indicator (8) and the ring (5) are prevented from moving relative to each other when the locking indicator is in one of the reference positions.

* * * * *